United States Patent Office
3,028,759
Patented Apr. 10, 1962

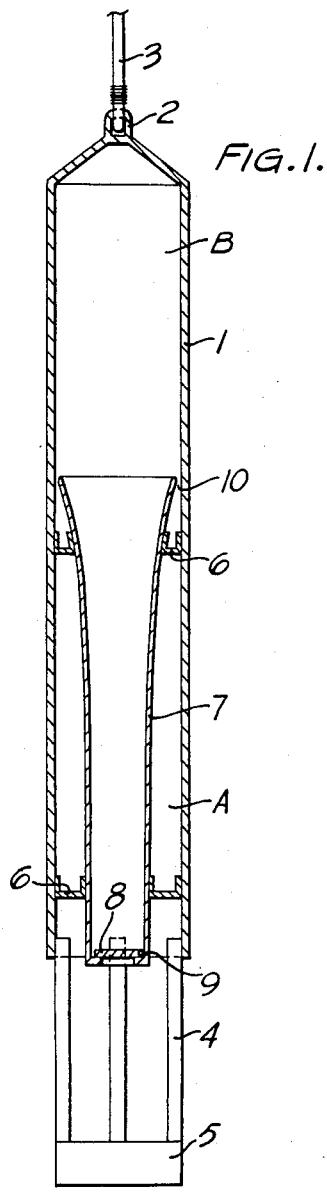

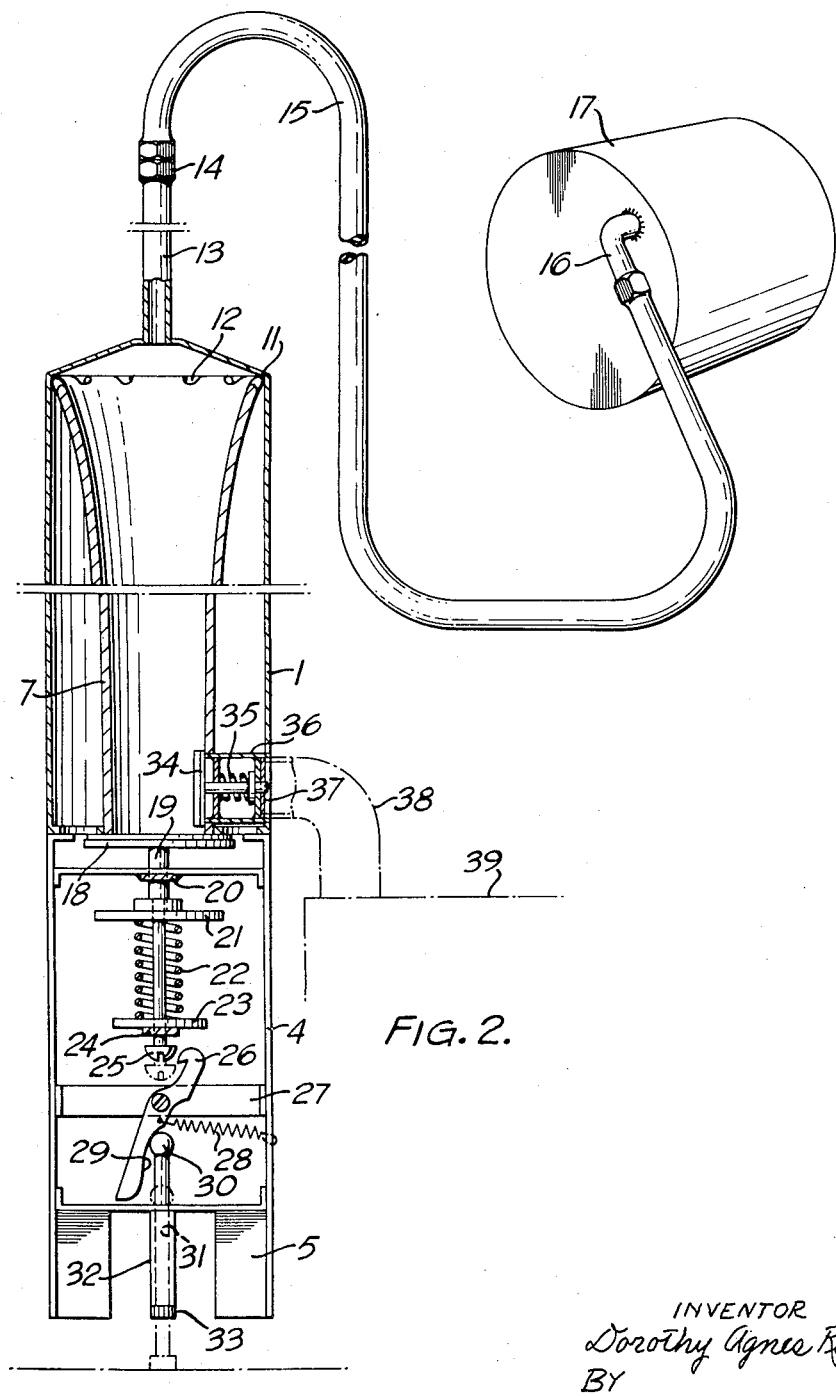

3,028,759
METHOD AND APPARATUS FOR OBTAINING AVERAGE SAMPLES OF LIQUID IN TANKS
Dorothy Agnes Ramsay, Ealing, London, England, assignor to S. Smith & Sons (England) Limited, a corporation of Great Britain
Filed Aug. 27, 1959, Ser. No. 836,518
Claims priority, application Great Britain Aug. 29, 1958
10 Claims. (Cl. 73—425.4)

This invention relates to a method and apparatus for obtaining average samples of liquids for testing purposes.

Certain liquids, such as petrol, oil, beer or milk are normally stored in great bulk in large tanks, and it is generally desirable when delivery of such liquids is to be made, to estimate amongst other factors what will be the specific gravity and the temperature of such stored liquids. It is, of course, well known that during storage the specific gravity of the liquid will vary at different depths in the storage tank and thus to estimate the specific gravity of the liquid and indeed its average temperature it is essential to obtain a sample of such liquid, which sample includes amounts taken from different depths in the storage tank.

According to the present invention the method of obtaining average samples of liquid for testing purposes consists in gradual immersion of a collecting vessel in a liquid, dividing the liquid entering the vessel into at least two streams, the rate of increase of one of said streams with respect to the depth of immersion in said liquid being a predetermined function of said depth, the said stream being trapped within the vessel at some desired depth, the function being such that the trapped liquid is an average sample of the liquid above said depth.

The apparatus for carrying the method into effect may comprise a collecting vessel open at the lower end for liquid flow into said vessel and means for partitioning off an area in said vessel, so that any flow of liquid into said vessel is divided into two separate streams, one of which is directly proportional to the liquid pressure, said partitioning means being so formed relative to the inner wall of said vessel that, as liquid rises in the vessel, the levels and pressures on either side of said partitioning means are equal, but the cross-sectional area on one side of said means changes in such a way as to compensate for the decrease in increment level.

The apparatus preferably comprises an outer collecting vessel open at the lower end for liquid flow into said vessel and an inner collecting vessel in open communication at the upper end with the outer vessel, the inner collecting vessel forming the partitioning means and being so shaped that the cross-sectional area of the inner vessel increases from entry thereinto so as to accommodate therein a volume of liquid proportional to the depth that the outer vessel is immersed in the bulk liquid, so that, for increment increase in pressure within the outer vessel, a proportional increment increase of liquid is admitted to the inner vessel, and a one-way valve means at the entry to the inner vessel for trapping liquid in said vessel when the apparatus is withdrawn from the bulk liquid.

Preferably the outer vessel carries a mass to assist in the immersion of the apparatus within the bulk liquid and in one arrangement the lower end of the outer vessel is open and the upper end sealed, carrying at said upper end means by which the apparatus can be lowered into and withdrawn from bulk liquid in a storage tank. In this arrangement it is preferred to provide a number of legs depending from the lower end of the outer vessel, said legs carrying at their base a weight which, in addition to assisting immersion of the apparatus, prevents the vessel from entering any sludge in the base of the tank. In this arrangement also, the inner vessel is preferably funnel or trumpet-shaped, the smallest diametrical portion being maintained level with the base of the outer vessel, this said portion being closable by a one-way valve. The upper end of the inner vessel is so positioned within the outer vessel as to leave a substantial space thereabove, and so dimensioned as to leave a small gap between it and the inner wall of the outer vessel to allow for flow of fluid therethrough.

In an alternative form the upper end of the funnel or trumpet-shaped inner vessel is positioned adjacent the top of the outer vessel and in contact with the inner wall thereof, one or more grooves being provided to allow for flow of fluid past the upper end of the inner vessel. The upper end of the outer vessel, instead of being sealed, communicates with a pipe leading to an air container, the volume of the pipe and container being equivalent in volume to that of the space in the previous arrangement above the top of the inner vessel and the top of the inner vessel and the top of the outer vessel.

In this alternative form the outer vessel is again supported by legs carrying a weight to assist in immersion of the apparatus, whilst the lower end of the inner vessel is closed by a spring-controlled valve.

There may also be provided in this arrangement a spring-loaded one-way valve which can allow communication between the inside of the inner vessel and an outlet pipe adapted to be coupled through the outer vessel, so that liquid stored in the inner vessel can be drawn off for testing purposes to any required vessel.

Two forms of the invention are diagrammatically illustrated in the accompanying drawings in which FIGURE 1 is a longitudinal section of one form and FIGURE 2 is a part section of the alternative form.

Referring to FIGURE 1 the apparatus comprises an outer cylindrical vessel 1, closed at the top and formed with a suspension hook 2 to receive any suitable suspension and/or lowering means such as a rope 3. The lower end of the outer vessel 1 has secured thereto a number of supporting legs 4, joined together at the base by a weight 5. Suspended within the outer vessel 1 by spider or like centering means 6 is an inner vessel 7 in the form of an elongated funnel or trumpet. The lower end of said vessel is flush with the lower end of the outer vessel 1 and is closed by a flap valve 8, pivoted at 9. The upper end of the inner vessel 7 is so dimensioned as to provide a small passage 10 permitting fluid flow between the vessels.

Referring to FIGURE 2 the apparatus again comprises the outer vessel 1 and inner vessel 7, but in this arrangement the upper end of the vessel 7 is a friction fit with the inner wall of the outer vessel 1 adjacent the top thereof as shown at 11. To allow for fluid flow between the two vessels, the upper end of the inner vessel 7 is formed with a number of grooves 12. The upper end of the outer vessel is in open communication with a pipe 13 to which is adapted to be detachably coupled by means of nuts 14, a flexible pipe 15 to an inlet 16 of an air container 17.

The lower ends of the outer vessel 1 again includes supporting legs 4 carrying immersion weights 5, but the base of the inner vessel 7 is openable by a manually operable valve arrangement. This includes a disc valve 18 adapted to seat on the lower end of said inner vessel, the disc valve being carried by a spindle 19, adapted to slide through cross members 20 forming part of the supporting legs. The spindle 19 has fixedly attached thereto a disc or plate 21, which forms a bearing plate for a spring 22, the other end of which bears against a similar plate 23, said plate 23 resting on a further cross member 24. The lower end of the spindle 19 terminates in an enlarged portion 25 adapted to cooperate with a latch 26 for holding the valve in an open position as will be described below. The latch mechanism 26 is pivotally mounted on a further cross member 27 and is biased by a spring 28 to a closed position. The latch 26 is formed with a cam surface 29 with which co-operates a cam follower 30, carried by a hand control rod 31 passing through a sleeve 32 and terminating in an operating head 33. Within the inner vessel 7 is positioned a valve 34 to seal an outlet from said vessel to a pipe 38 leading to a separate chamber 39 for receiving the sample liquid from the inner vessel 7 for testing purposes. The valve 34 is biased into sealing position by a spring 35 within the valve casing 36. The pipe 38 includes at its open end a cross member 37 which, when the pipe is inserted into the valve casing, presses on the valve spindle to overcome the action of the spring 36.

Before describing the operation of the apparatus it is to be appreciated that when a cylindrical vessel, which is closed at the top and open at the bottom, is lowered into a liquid, liquid enters the vessel through the open end and compresses the air in the vessel until the pressure in the vessel is equal to the hydrostatic pressure of the liquid. The pressure in the vessel is always directly proportional to the head of liquid, i.e. to the depth of the vessel below the surface. The volume of the air in the vessel is governed by the known fact that, if the temperature is kept constant, the product of the pressure and the volume of the air is constant.

The volume of liquid which enters the vessel for any given increment in depth is directly proportional to the difference between the volume of the air before the increment in depth and the volume of the air after the increment in depth.

For equal increments of depth, the increment of liquid entering the vessel decreases as the depth increases, in accordance with the known law governing pressure and volume of a gas, which is stated above.

The arrangement of a collecting vessel without means for dividing the inflow into two separate streams is, therefore, useless as a means of collecting an average sample of liquid from a tank, because, for this purpose, it is necessary that the vessel should collect an equal increment of liquid for each equal increment in depth below the surface.

The shape of the inner vessel in either construction described above is such that its cross-sectional area at any point along its axis, multiplied by the rate of increase of level of liquid with increase of pressure in the device at that point, is constant.

This may be stated as follows:

Let "$h$"=liquid level in outer vessel and inner vessel at any pressure "$p$."

Let "$a$"=cross-sectional area of inner vessel at the point in the axis corresponding to "$h$."

"$dp$" is a small increment in "$p$."

"$dh$" is the corresponding change in "$h$."

Then $a \times dh/dp$ is a constant.

An inner vessel designed on the above law will be larger in diameter at the top than at the bottom, and it will curl outwards towards the top, if the outer vessel is cylindrical or has parallel vertical sides.

The outside diameter of the top of the inner vessel is conveniently made nearly equal to the internal diameter of the outer vessel, leaving sufficient space for air to pass up the outer vessel past the inner vessel.

Let—

$P_1$=atmospheric pressure.

$P_2$=atmospheric pressure plus the maximum pressure (corresponding to the maximum depth of liquid) which is to be encountered.

$V_1$=volume of the outer vessel.

$V_2$=volume of air in the outer vessel at $P_2$.

Then $P_1V_1=P_2V_2$.

Let $L$=level of liquid in outer vessel at $P_2$.

Then $L=V_1-V_2$.

The length of the outer vessel is proportional to $V_1$, and the length of the inner vessel must be made proportional to $L$.

Variations in atmospheric pressure, and changes in temperature of the air as it is compressed in the cylinder will cause errors in the constant proportionality between depth of liquid and amount of liquid entering the inner vessel, but these errors are not sufficient in normal conditions to render the device inoperative.

Referring now back again to FIGURE 1 the apparatus works in the following manner:

The apparatus is lowered by means of the suspension cable 3 into a storage tank full of liquid. As the lower end of the outer vessel 1 and inner vessel 7 enter the liquid, liquid passes into the space A between the inner and outer vessels and at the same time the flap valve 8 opens, due to the pressure of the liquid, which liquid then enters the inner vessel 7 so that the flow of liquid into the apparatus is divided into two separate streams. As the apparatus continues to be immersed, which immersion is assisted by the weight 5, the air in the cylinder as the level rises is forced into the space B above the top of the inner vessel and compressed therein. The dimensions of the inner vessel and outer vessel are, of course, so arranged that, when the weight 5 rests on the bottom of the storage tank, sufficient liquid will have entered the inner vessel 7 to provide average samples of liquid from the tank. Once the apparatus has rested on the base of the tank, the apparatus is withdrawn from the tank and this upward movement causes the flap valve 8 to close trapping within the inner vessel the sample liquid. Air in space B expands forcing out of the outer vessel 1 any liquid in the space A. The necessary liquid for testing purposes is therefore obtained within the inner vessel 7.

Referring now to the arrangement shown in FIGURE 2 before feeding the apparatus into the storage tank, the rod 31 is manually pulled down, by grasping the head 33, to the dotted line position shown in FIGURE 2; this movement causes, through the cam follower 30, pivotal movement of the latch 26 in an anti-clockwise direction so that it engages, upon depression of the disc 21 together with the spindle 19, with the enlarged head 25 of the spindle 19. It will thus be appreciated that the disc valve 18 has been moved off its seating and is held in this position. The apparatus can now be lowered into the storage tank to obtain the necessary sample of liquid for testing purposes. As the lower end of the outer vessel 1 and inner vessel 7 enter the liquid, liquid flows into both vessels and air within the said vessels is compressed and, as the liquid within the vessels rises, the air is compressed within the pipe 15 and container 17. When the apparatus is approaching the bottom of the tank, the time arrives when the head 33 touches the bottom and, as the apparatus continues to be lowered, an upward force is exerted on the hand control rod 31 by said head 33 to cause the cam follower 30 to ride over the cam track 29 and bring the latch 26 out of engagement with the enlarged portion 25 of the spindle 19. When this has occurred, the spring 22 closes the valve 18 on to its seating, thus trapping within the inner vessel 7 liquid contained therein. All that is necessary is to withdraw the apparatus from the tank, liquid within the outer vessel 1 being forced out therefrom by the air compressed in the container 17 and pipe 15.

When it is desired to test the liquid within the inner vessel 7, the pipe 38 is inserted into the valve casing 36 through the wall of the outer vessel 1 and the cross member 37 in said pipe acts against the action of the spring 35 to open the valve 34. Hence liquid in the inner vessel 7 can flow out therethrough through the pipe 38 into the separate chamber 39.

It will be appreciated that in either of the constructions described with reference to FIGURE 1 or 2 once the sample of liquid is obtained the temperature of the liquid can be ascertained in any convenient way and this may be done by providing any known stirring mechanism to be inserted into the inner vessel to ensure that before taking the temperature of the liquid there is a constant temperature throughout the liquid.

Alternatively the sample liquid may be discharged from the inner vessel 7 either as described with reference to FIGURE 2 or when using the arrangement shown in FIGURE 1 to a separate chamber and its temperature measured by any convenient means.

What I claim is:

1. Apparatus for obtaining from bulk liquid average samples of liquid for testing purposes comprising an outer collecting vessel open at the lower end for liquid flow into said vessel, an inner collecting vessel in open communication at the top end with the outer vessel and having an entry opening below its top end, said inner collecting vessel forming partitioning means and being so shaped that the cross-sectional area of the inner vessel increases upwardly from entry thereinto so as to accommodate therein a volume of liquid proportional to the depth that the outer vessel is immersed in the bulk liquid, so that, for increment increase in pressure within the outer vessel, a proportional increment increase of liquid is admitted to the inner vessel, and a one-way valve means at the entry to the inner vessel for trapping liquid in said vessel when the apparatus is withdrawn from the bulk liquid.

2. Apparatus as claimed in claim 1 in which the lower end of the outer vessel is open, the upper end being sealed, said apparatus further comprising carrying means by which the apparatus can be lowered into and withdrawn from the bulk liquid, supporting legs on the lower end of the outer vessel, and a weight carried by said legs and which, in addition to assisting immersion of the apparatus, prevents the vessel from entering any sludge in the bottom of the bulk liquid.

3. Apparatus as claimed in claim 1 in which the inner vessel is funnel or trumpet shaped, the smallest diametrical portion being level with the base of the outer vessel, said smallest diametrical portion being closable by said one-way valve.

4. Apparatus as claimed in claim 1 in which the upper end of the inner vessel is so positioned within the outer vessel as to leave a substantial space thereabove, and so dimensioned so as to leave a small gap between it and the inner wall of the outer vessel to allow for flow of fluid therethrough.

5. Apparatus as claimed in claim 3 in which the upper end of said inner vessel is positioned adjacent the top of the outer vessel and in contact with the inner wall thereof, one or more grooves being provided to allow for flow of fluid past the upper end of the inner vessel.

6. Apparatus as claimed in claim 1 further comprising a pipe for connecting the upper end of the outer vessel to an air container.

7. Apparatus as claimed in claim 1 comprising a spring normally holding said one-way valve closed.

8. Apparatus as claimed in claim 5 further comprising an outlet pipe communicable with said inner vessel and extending through said outer vessel, and a spring loaded one-way valve for controlling communication between the inside of the inner vessel and said outlet pipe so that liquid stored in the inner vessel can be drawn off for testing purposes.

9. Apparatus as claimed in claim 7 in which the valve comprises a disc type valve spring biased into closed position, latch means being provided for holding the valve open against the bias of the spring.

10. Apparatus as claimed in claim 9 including valve closing control means for releasing said latch for enabling spring bias closing of said valve, said control means comprising a movable rod having a cam follower, and a cam surface on said latch means engageable by said cam follower upon movement of said rod for releasing the hold of said latch means on said valve.

References Cited in the file of this patent

UNITED STATES PATENTS

| | | |
|---|---|---|
| 1,410,904 | Fitzpatrick | Mar. 28, 1922 |
| 1,938,079 | Maras et al. | Dec. 5, 1933 |
| 2,274,869 | Pfeiffer | Mar. 3, 1942 |

FOREIGN PATENTS

| | | |
|---|---|---|
| 21,409 | Great Britain | 1912 |